US007826546B2

(12) United States Patent
Ahn

(10) Patent No.: US 7,826,546 B2
(45) Date of Patent: Nov. 2, 2010

(54) COMMUNICATION SYSTEM, TRANSMITTER, RECEIVER, TRANSMITTING METHOD, RECEIVING METHOD, AND PROGRAM

(75) Inventor: Chang-Jun Ahn, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 837 days.

(21) Appl. No.: 10/585,898

(22) PCT Filed: Jan. 14, 2004

(86) PCT No.: PCT/JP2004/000171

§ 371 (c)(1),
(2), (4) Date: Apr. 9, 2007

(87) PCT Pub. No.: WO2005/069508

PCT Pub. Date: Jul. 28, 2005

(65) Prior Publication Data

US 2008/0025198 A1    Jan. 31, 2008

(51) Int. Cl.
*H04B 7/02* (2006.01)
(52) U.S. Cl. .................................................. 375/267
(58) Field of Classification Search .............. 375/260, 375/267, 299
See application file for complete search history.

(56) References Cited

U.S. PATENT DOCUMENTS

| 2002/0009156 | A1* | 1/2002 | Hottinen et al. | ............. | 375/267 |
| 2004/0264592 | A1* | 12/2004 | Sibecas et al. | ............. | 375/267 |
| 2006/0239233 | A1* | 10/2006 | Hanada et al. | ............. | 370/335 |

OTHER PUBLICATIONS

Kambayashi et al (OFDM/SDM System Using Adaptive Transmit Phase Control to Mitigate Co-Channel Interference, 2002 IEEE 56th Vehicular Technology Conference Proceedings, vol. 4 of 4, Vancouver, Canada Sep. 24-28, 2002).*

Antenna-Phase Controlled SDM/OFDM With Polarization Diversity for Dynamic Parameter Controlled OFDM System (The Institute of Electronics, Information and Communication Engineers), Technical Report of IEICE, DSP2003-188, SAT2003-185, RCS2003-283(Jan. 2004).

(Continued)

*Primary Examiner*—David C Payne
*Assistant Examiner*—Leon-Viet Q Nguyen
(74) *Attorney, Agent, or Firm*—Honigman Miller Schwartz and Cohn LLP

(57) ABSTRACT

A transmitter codes data to be transferred, performs serial-parallel conversion of the data to two signal groups, and passes one of the groups to a first transmission unit and the other one to a second transmission unit. Each of the first transmission unit and the second transmission unit performs a prephasing process on each of signals included in the input signal group received, performs inverse Fourier transform thereon, and transmits the signal with a predetermined polarization. The polarity of the predetermined polarization of the first transmission is orthogonal to a polarity of the predetermined polarization of the second transmission unit. A receiver receives a signal transmitted from the transmitter with a predetermined polarization, performs Fourier transform thereon, performs MLD (Maximum Likelihood Detector) detection thereof, performs parallel-serial conversion in a parallel-serial converting unit, and decodes a signal originating from the parallel-serial conversion to output the transferred signal. The transmitter performs the prephasing process on each of the signals based on feedback information sent from the receiver in such a way that a probability that a same phase is generated becomes lower.

9 Claims, 8 Drawing Sheets

OTHER PUBLICATIONS

Space Division Multiplexing (SDM) for OFDM Systems, 2000 IEEE, 51st Vehicular Technology Conference Proceedings, May 15-18, 2000 Tokyo, Japan.

A Combined OFDM/SDMA Approach, IEEE Journal on Selected Areas in Communications, Wireless Communications Series, Nov. 2000, vol. 18, No. 11, Nov. 2000.

Experimental Results of Cross Polarization Discrimination and Signal Correlation Values for a Polarization Diversity Scheme, 1997 IEEE 47th Vehicular Technology Conference, Phoenix, AZ, May 4-7, 1997.

OFDM/SDM System Using Adaptive Transmit Phase Control to Mitigate Co-Channel Interference, 2002 IEEE 56th Vehicular Technology Conference Proceedings, vol. 4 of 4, Vancouver, Canada Sep. 24-28, 2002.

* cited by examiner

COMMUNICATION SYSTEM, TRANSMITTER, RECEIVER, TRANSMITTING METHOD, RECEIVING METHOD, AND PROGRAM

TECHNICAL FIELD

The present invention relates to a communication system, a transmitter, a receiver, a transmitting method, and a receiving method, which efficiently perform communications using antennas of different polarizations, and a program which allows a computer to realize them.

BACKGROUND ART

There is an increasing demand for a high data rate in wireless communications. As techniques that fulfill such a demand, techniques, such as SDM (Space Division Multiplexing), OFDM (Orthogonal Frequency Division Multiplexing), MLD (Maximum Likelihood Detection), polarization diversity, and adaptive phase control, have been proposed in the following documents.

[Non-patent document 1] A. V. Zelst, R. V Nee and G. Awater, Space Division Multiplexing (SDM) for OFDM Systems, Proc. of VTC, pp. 15-18, 2000.

[Non-patent document 2] P. Vandenameele, L. V. Perre, M. G. E. Engels, B. Gyselinck and H. D. Man, A combined OFDM/SDMA approach, IEEE Journal of sel Area in Common, vol. 18, no. 11, pp. 2312-2321, 2000.

[Non-patent document 3] J. J. A. Lempianen, J. K. Laiho-Steffens, A. Wacker, Experimental results of cross polarization discrimination and signal correction values for a polarization diversity scheme, Proc. of VTC 97, vol. 3, pp. 1498-1502, 1997.

[Non-patent document 4] T. Kambayashi, T. Horinouchi, M. Shibahara, T. Fujii and I.

Sasae, SDM/OFDM system using adaptive transmit phase control to mitigate co-channel interference, Proc. of VTOC 02 fall, pp. 2091-2095, 2002.

Non-patent document 1 discloses an invention which combines the OFDM scheme with the SDM scheme. Particularly, it shows that the use of a plurality of antennas on both a receiver side and a transmitter side can achieve a high transfer rate on multiple input multiple output (MIMO) channels.

In the OFDM/SDM scheme, however, various schemes which can achieve faster communications with higher quality are further demanded.

Non-patent document2 discloses an MLD scheme. It is known that the SDM scheme degrades the transfer quality due to co-channel interference (CCI). While schemes to mitigate co-channel interference include MMSE (Minimum Mean Square Error), PIC (Parallel Interference Canceler), and SIC (Serial Interference Canceler), MLD has the best performance among them. Particularly, a scheme of separating a desired signal and a CCI signal by generating a replica of a received signal and using a pilot signal is disclosed.

It is known however that when the reception powers of desired symbols received from different antennas are close to each other, the same replica is generated, thus degrading the MLD detection performance.

Further, non-patent document 3 discloses a polarization diversity scheme. It is known the XPD (CROSS Polarization discrimination) value for a combination of a horizontal polarization antenna and a vertical polarization antenna varies between 5 dB and 15 dB depending on the environment.

This is the result of measuring the ratio of reception powers in orthogonal diversity branches. When the reception powers of the polarization branches become equal to each other, the maximum diversity gain is achieved.

When the unbalance of reception powers becomes large, however, the entire diversity system will not operate. This is because weak channels are neglected at the stage of coupling diversities.

Non-patent document 4 discloses an adaptive phase control scheme in SDM/OFDM communication. In particular, a system which requires a look-up table and feedback information for adaptively controlling the phase is disclosed.

In consideration of a case where the amplification factors become identical and the phases become identical, the look-up table and feedback information should be made huge.

The invention has been made to solve various problems of the known systems, and it is an object of the invention to provide a communication system, a transmitter, a receiver, a transmitting method, and a receiving method, which efficiently perform communications using antennas of different polarizations, and a program which allows a computer to realize them.

DISCLOSURE OF INVENTION

To achieve the object, the invention set forth below is disclosed according to the principle of the invention.

A communication system according to the first aspect of the invention comprises a transmitter and a receiver, and is configured as follows.

First, the transmitter has a coding unit, a serial-parallel converting unit, a first transmission unit, and a second transmission unit.

Each of the first transmission unit and the second transmission unit includes a prephasing unit, an inverse Fourier transform unit, and a transmitting unit.

The coding unit codes data to be transferred.

The serial-parallel converting unit performs serial-parallel conversion of the coded signal to two signal groups.

Further, the first transmission unit receives one of the serial-parallel converted signal groups.

The second transmission unit receives an other one of the serial-parallel converted signal groups.

The prephasing unit performs a prephasing process on each of signals included in the input signal group received.

Further, the inverse Fourier transform unit performs inverse Fourier transform on signals originating from the prephasing process.

The transmitting unit transmits the inverse Fourier transformed signal with a predetermined polarization.

The polarity of the predetermined polarization of the first transmission is orthogonal to a polarity of the predetermined polarization of the second transmission unit.

Further, the receiver includes a receiving unit, a Fourier transform unit, a detection unit, a parallel-serial converting unit, and a decoding unit.

The receiving unit receives a signal transmitted from the transmitter with a predetermined polarization.

The Fourier transform unit performs Fourier transform on the received signal.

Further, the detection unit performs MLD detection of signals originating from the Fourier transform.

The parallel-serial converting unit performs parallel-serial conversion on the MLD detected signals.

The decoding unit decodes a signal originating from the parallel-serial conversion to output the transferred signal.

Further, the receiver generates feedback information for the prephasing process in the transmitter, and sends the feedback information to the transmitter.

The transmitter performs the prephasing process on each of the signals based on the feedback information sent from the receiver in such a way that a probability that a same phase is generated becomes lower.

In the communication system of the invention, each of the first transmission unit and the second transmission unit of the transmitter can be configured to multiplex the input signals received and a pilot signal, perform serial-parallel conversion on a signal originating from the multiplexing, and perform a prephasing process on signals originating from the serial-parallel conversion, instead of performing a prephasing process on the input signals received.

A transmitter according to another aspect of the invention is a transmitter in the communication system.

A receiver according to a further aspect of the invention is a receiver in the communication system.

A transmitting method according to a further aspect of the invention comprises a coding step, a serial-parallel converting step, a first transmission step, and a second transmission step.

Each of the first transmission step and the second transmission step includes a prephasing step, an inverse Fourier transform step, and a transmitting step.

The coding step codes data to be transferred.

The serial-parallel converting step performs serial-parallel conversion of the coded signal to two signal groups.

Further, the first transmission step receives one of the serial-parallel converted signal groups.

The second transmission step receives an other one of the serial-parallel converted signal groups.

The prephasing step performs a prephasing process on each of signals included in the input signal group received.

Further, the inverse Fourier transform step performs inverse Fourier transform on signals originating from the prephasing process.

The transmitting step transmits the inverse Fourier transformed signal with a predetermined polarization.

The polarity of the predetermined polarization of the first transmission is orthogonal to a polarity of the predetermined polarization of the second transmission step.

The prephasing step performs the prephasing process on each of the signals based on feedback information sent from a receiver in such a way that a probability that a same phase is generated becomes lower.

Each of the first transmission step and the second transmission step of the transmitting method of the invention can be configured to multiplex the input signals received and a pilot signal, perform serial-parallel conversion on a signal originating from the multiplexing, and perform a prephasing process on signals originating from the serial-parallel conversion, instead of performing a prephasing process on the input signals received.

A receiving method according to a still further aspect of the invention comprises a receiving step, a Fourier transform step, a detection step, a parallel-serial converting step, and a decoding step, and is configured as follows.

The receiving step receives a signal transmitted from a transmitter with a predetermined polarization.

Further, the Fourier transform step performs Fourier transform on the received signal.

Further, the detection step performs MLD (Maximum Likelihood Detector) detection of signals originating from the Fourier transform.

The parallel-serial converting step performs parallel-serial conversion on the MLD detected signals; and The decoding step decodes a signal originating from the parallel-serial conversion to output the transferred signal.

Further, feedback information for a prephasing process in the transmitter is generated and sent to the transmitter.

A program according to a further aspect of the invention allows a computer to function as the individual units of the transmitter as set forth above.

A program according to a further aspect of the invention allows a computer to function as the individual units of the receiver as set forth above.

As the program of the invention is run on a computer capable of communicating with other devices can achieve the transmitter, the receiver, the transmitting method and the receiving method of the invention.

An information recording medium recording the program of the invention may be distributed and sold independently of the computer. The program of the invention may be transferred, distributed and sold over a computer network like the Internet.

When the computer has a programmable electronic circuit, such as a DSP (Digital Signal Processor) or an FPGA (Field Programmable Gate Array), particularly, it is possible to use a software radio type scheme of transferring the program of the invention recorded on an information recording medium and allowing the DSP or FPGA in the computer to run the program to achieve the transmitter or the receiver of the invention.

BEST MODE FOR CARRYING OUT THE INVENTION

While a best embodiment to carry out the invention will be described below, the embodiment is illustrated for the purpose of description, and other embodiments according to the principle of the invention are also encompassed in the scope of the invention.

Figure 1:
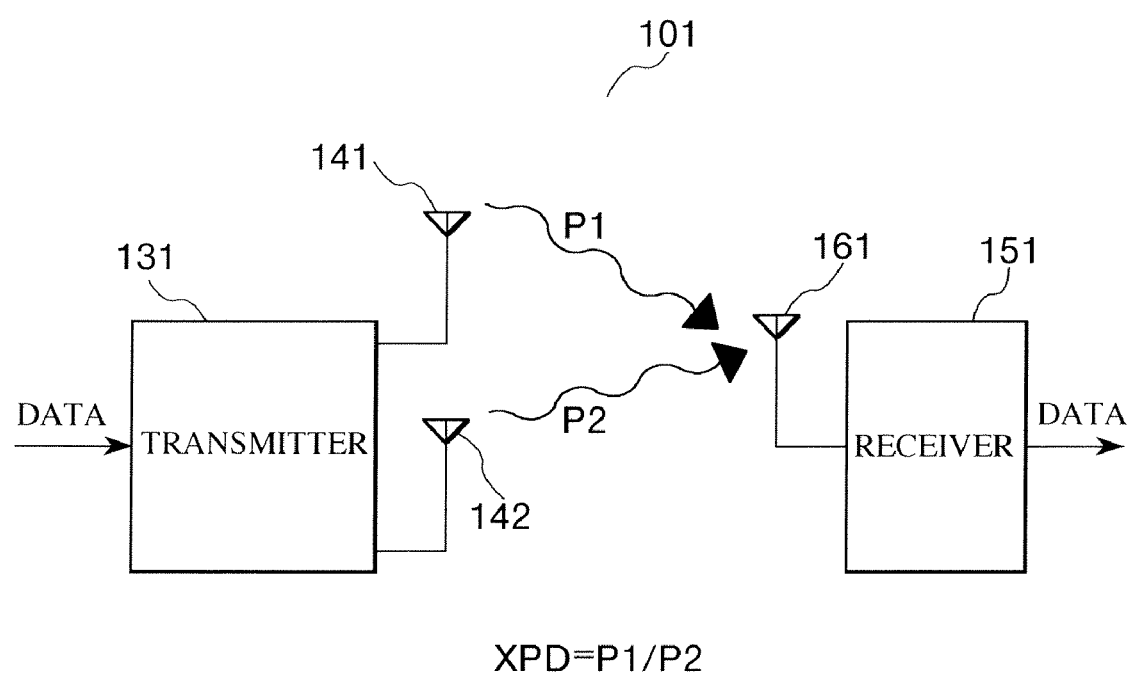
FIG. 1 is an exemplary diagram showing the schematic configuration of a communication apparatus according to one embodiment of the invention.

FIG. 1 is an exemplary diagram showing the schematic configuration of a communication system according to one embodiment of the invention. Description will be given below with reference to the diagram.

A transmitter 131 in a communication system 101 receives data to be transferred, and transmits signals from two antennas 141, 142. The two antennas 141, 142 are of different polarizations whose polarities are orthogonal to each other; typically, one of the antennas is a horizontal antenna and the other is a vertical antenna.

A receiver 151 receives signals transmitted from the two antennas 141, 142 at a single antenna 161 to acquire transferred data. The antenna 161 is an antenna having a predetermined polarity, typically a vertical antenna, but may be an antenna which has a polarization polarity in another direction. That is, one of the features of the embodiment lies in that the transmitter 131 performs transmission using different polarization antennas 141, 142 of different polarities, and the receiver 151 performs reception using only one polarization antenna 161 having a polarity only in a certain direction.

Transmitter

Figure 2:
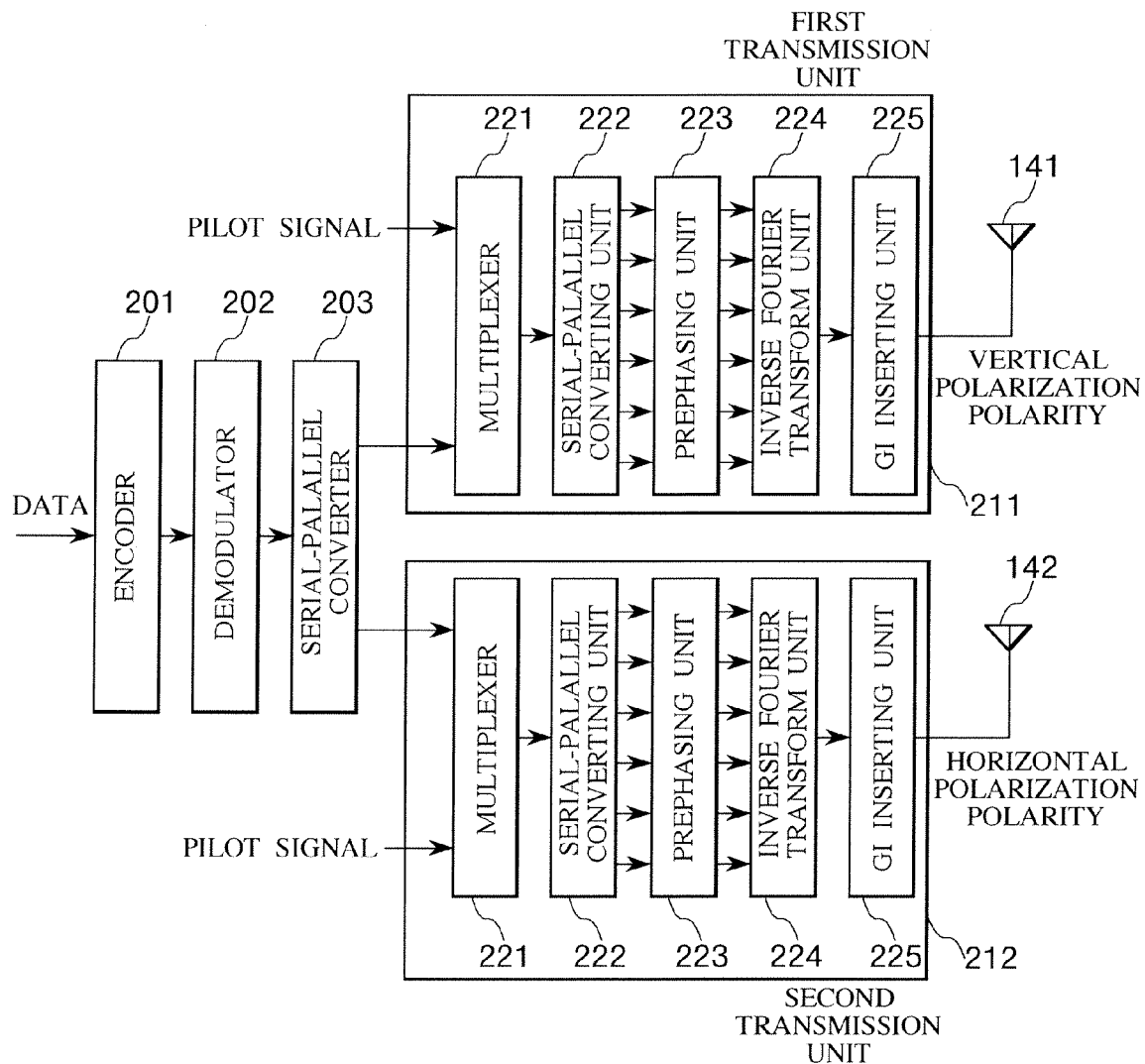
FIG. 2 is an exemplary diagram showing the schematic configuration of a transmitter.

FIG. 2 is an exemplary diagram showing the schematic configuration of the transmitter 131 of the embodiment. Description will be given below with reference to the diagram.

When receiving data to be transferred, the transmitter 131 passes the data to an encoder 201. The encoder 201 and a data modulator 202 perform various codings and modulation on data. The embodiment uses QPSK as a data modulation system.

When coding and modulation of data are finished, the data is first passed to a 1-input 2-output serial-parallel converter 203. The serial-parallel converter 203 passes acquired data to a first transmission unit 211 and a second transmission unit 212 in order.

Each of the first transmission unit 211 and the second transmission unit 212 is configured as follows.

That is, data given from the serial-parallel converter 203 and a pilot signal are multiplexed by a multiplexer 221, and are then subject to serial-parallel conversion to multiple channels in a serial-parallel converting unit 222.

At the time of multiplexing, a scheme of, for example, making the pilot signal of a predetermined number of symbols and the input signal of a predetermined number of symbols into one frame may be used.

Further, a prephasing unit 223 performs a prephasing process for each channel, and an inverse Fourier transform unit 224 performs inverse Fourier transform.

Then, a GI (Guard Interval) inserting unit 225 inserts a guard interval, and the signal is transmitted from the antenna 141 or the antenna 142.

Receiver

Figure 3:
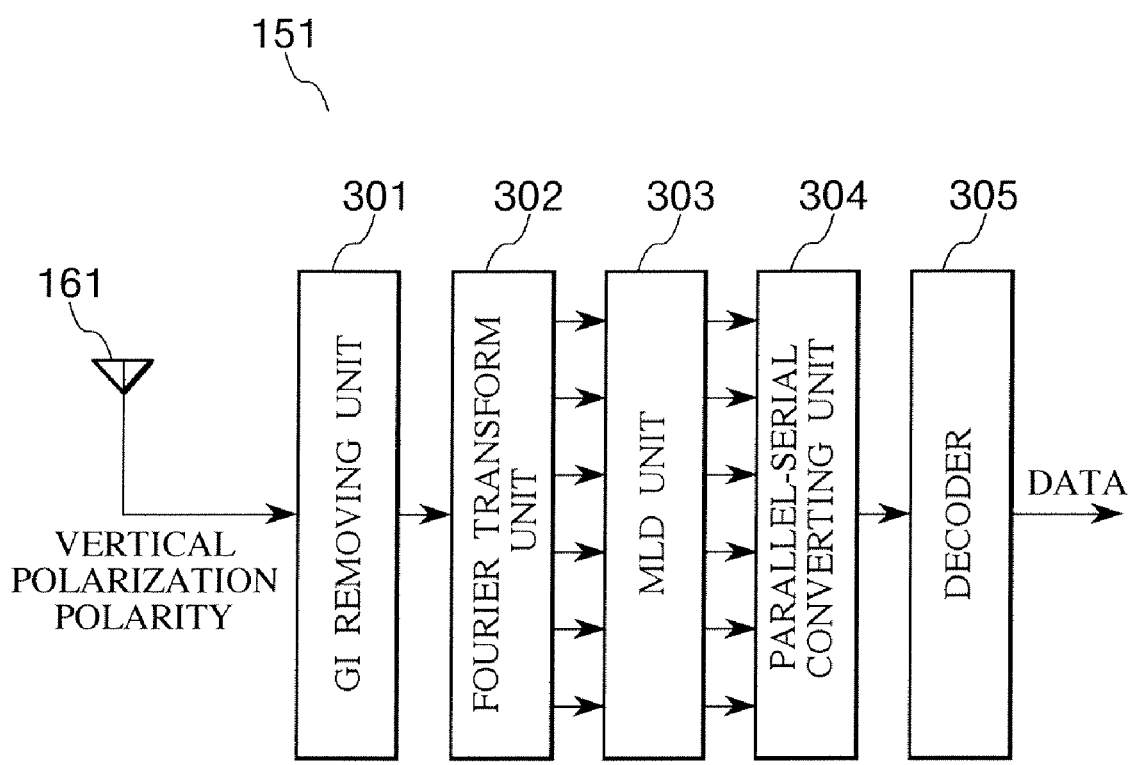
FIG. 3 is an exemplary diagram showing the schematic configuration of a receiver.

FIG. 3 is an exemplary diagram showing the schematic configuration of the receiver 151. Description will be given below with reference to the diagram.

The receiver 151 receives signals transmitted from the antenna 141 and the antenna 142 of the transmitter 131 at the single antenna 161.

Then, a GI removing unit 301 removes a guard interval, and a Fourier transform unit 302 performs fast Fourier transform to acquire a plurality of signals.

Further, an MLD unit 303 performs MLD detection to detect signals of the individual channels. Although the basic structure for the MLD detection is the same as the one disclosed in non-patent document 2, the MLD scheme is used in the embodiment very effectively as will be described later.

A parallel-serial converting unit 304 performs parallel-serial conversion, and a decoder 305 performs QPSK demodulation and decoding too acquire transferred data.

Figure 4:
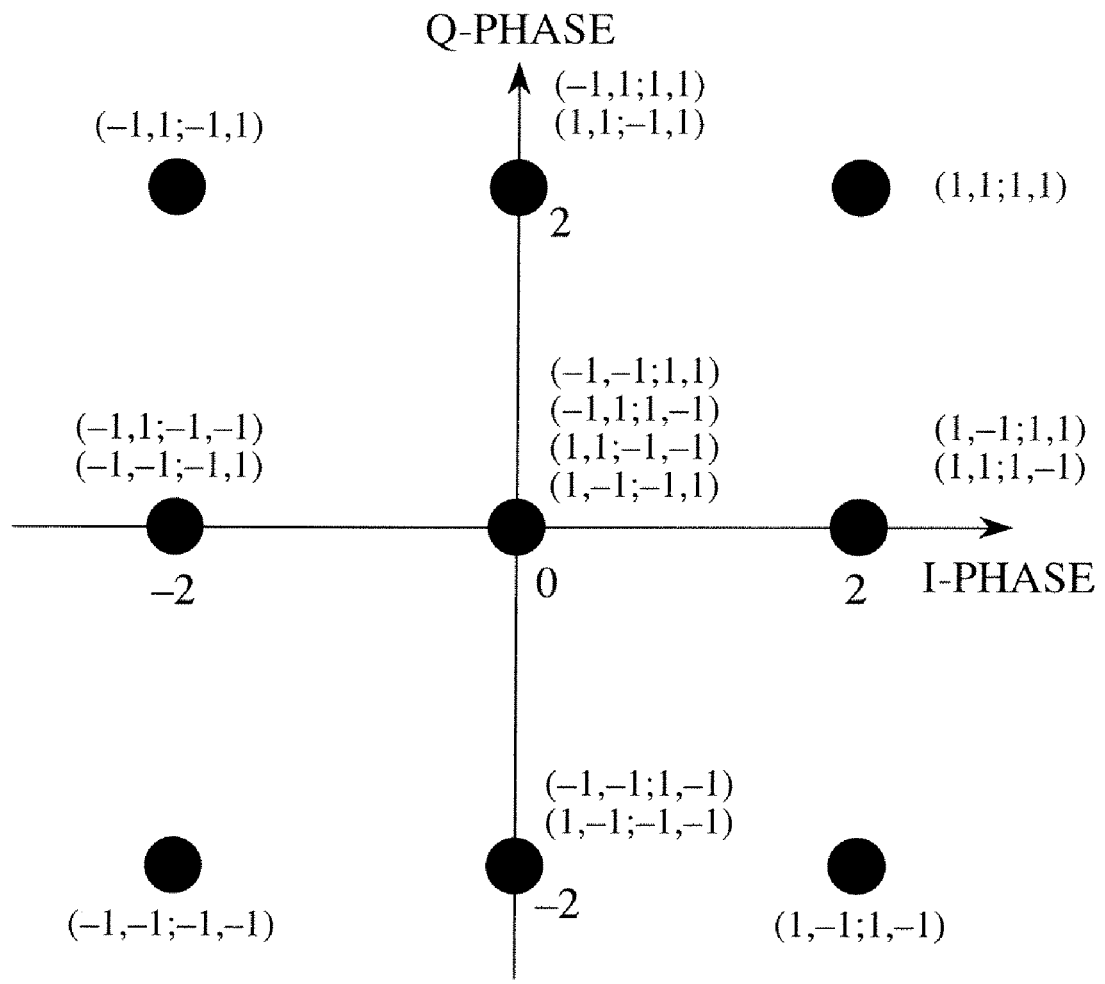
FIG. 4 is a constellation diagram of replica signals according to the conventional scheme.

If the reception powers of signals transmitted from the antennas 141, 142 of the transmitter 131 are the same, the constellation of replicas at the time of detecting signals over the individual channels in the MLD unit 303 of the receiver 151 becomes as shown in FIG. 4.

That is, there are 16 types of symbols having different amplification factors and phases on the transmission side, whereas the types are degenerated to 9 types.

Accordingly, the embodiment makes the polarization polarities of the antennas 141, 142 of the transmitter 131 different from each other (typically orthogonal to each other) as mentioned above, and performs a prephasing process to effect an adaptive phase control at the same time, thereby preventing degeneration.

As disclosed in non-patent document 3, when signals are transferred using different polarization antennas, the XPD value appearing on the reception side has a variation of about 5 dB to 15 dB depending on the environment.

In general, it is said that when reception powers suffer a large unbalance, the entire diversity system does not operate. This is because weak channels are neglected at the diversity coupling scheme. However, the embodiment positively utilizes such an unbalance to improve the MLD performance.

Figure 5:
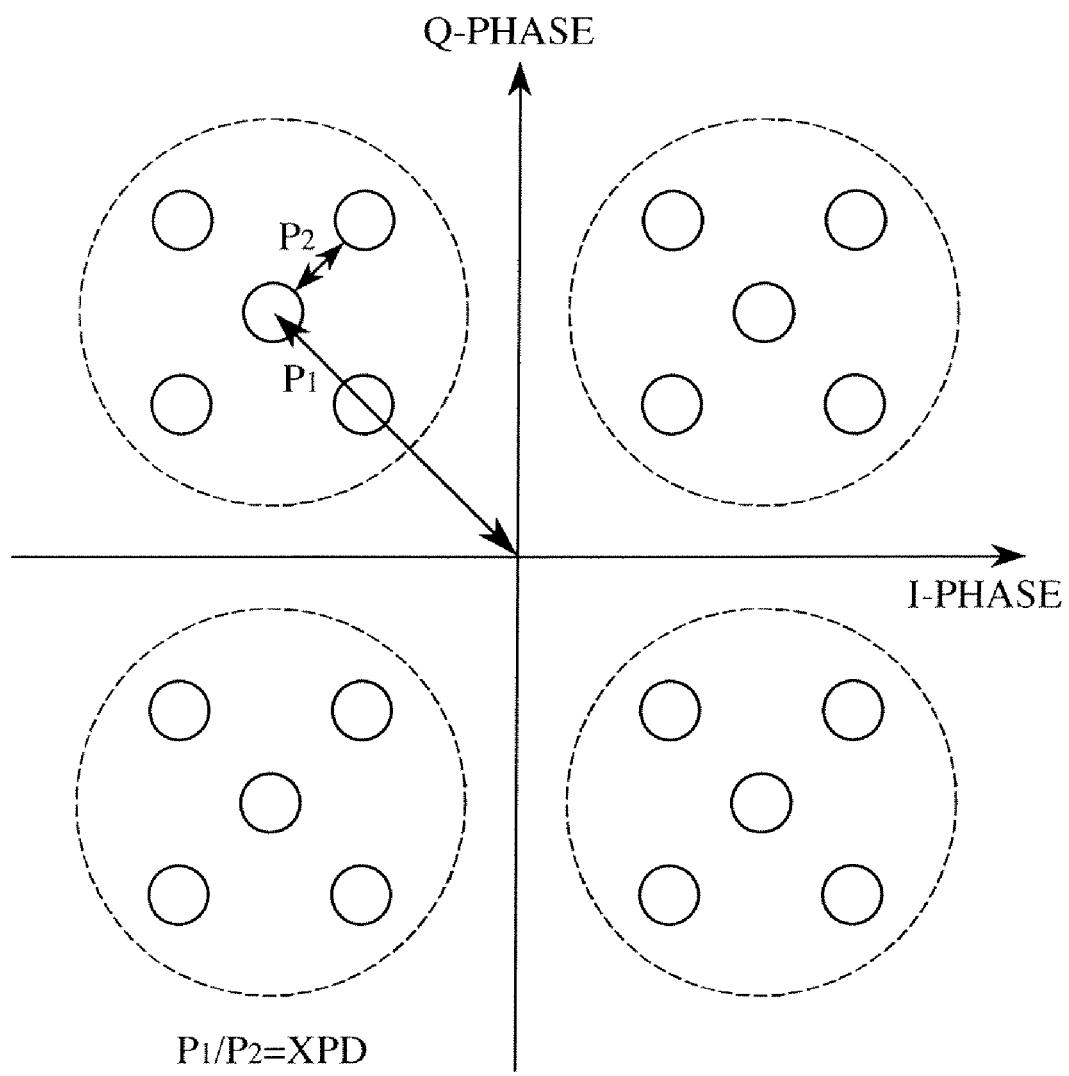
FIG. 5 is a constellation diagram of replica signals according to the embodiment.

That is, if reception powers of symbols which are received from different antennas differ, replicas differ too. Therefore, the constellation of replicas according to the embodiment is dispersed as the XPD value changes as shown in FIG. 5.

As shown in the diagram, the constellation of replicas appears at 16 locations. While five circles are drawn in each of the four quadratures in the diagram, the center one indicates a reference position and the circles arranged therearound are equivalent to replica signals.

The XPD value is a ratio P1/P2 of a distance (P1) from the center in the constellation diagram to a deviation (P2) orthogonal thereto, and P1 and P2 are equivalent to reception powers on the reception side with respect to the two antennas 141, 142 on the transmission side.

Further, the positive use of the foregoing dynamic phase control prevents the same phase from being generated over the individual channels as much as possible.

As disclosed in non-patent document 4, the SDM/OFDM system sends feedback information from the receiver to the transmitter to adaptively control the phase, and the transmitter performs prephasing of the phase channel by channel by referring to the look-up table.

The embodiment uses different polarizations as mentioned above, and is expected to provide the amplification factor with a difference of 5 dB or greater, so that the same phase and the same amplification factor hardly occurs.

Therefore, the embodiment can make the range of phase control narrower than the one disclosed in non-patent document 4. For example, with the phase difference in the prephasing process being 10 degrees or so, a sufficient performance is acquired as will be described later.

When the range of the phase control becomes narrower, the size of feedback information becomes smaller so that the size of the look-up table can be small. This serves to reduce the complexity of the entire communication system and reduce the cost.

The use of those schemes can improve the detection performance in the SDM/OFDM system according to the embodiment as compared with the conventional SDM/OFDM system that merely performs simple phase control.

The use of a scheme, such as software radio, allows the transmitter 131 and the receiver 151 to be realized by providing various computers, FPGAs (Field Programmable Gate Arrays) or DSPs (Digital Signal Processors) with software.

Experimental Results

Figure 6:
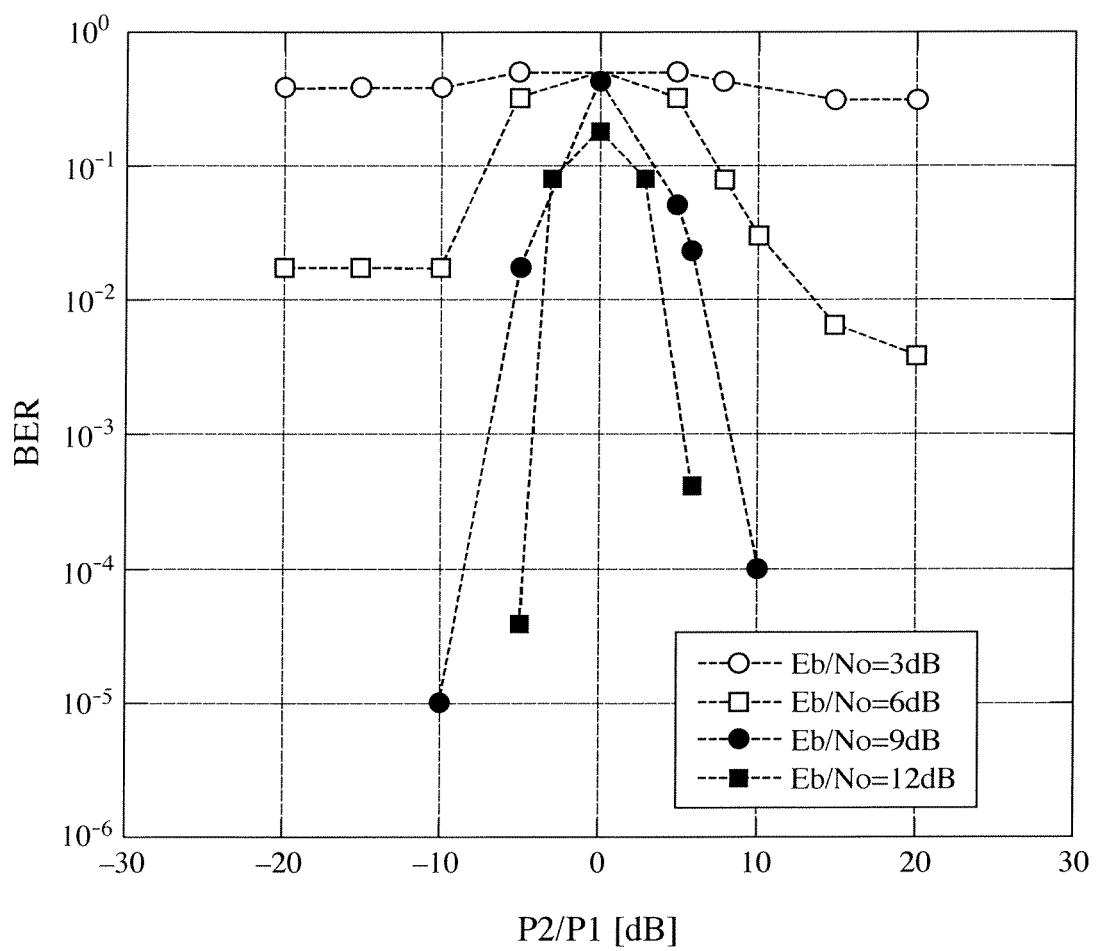
FIG. 6 is a graph showing the results of an experiment conducted in computer simulation.
Figure 7:
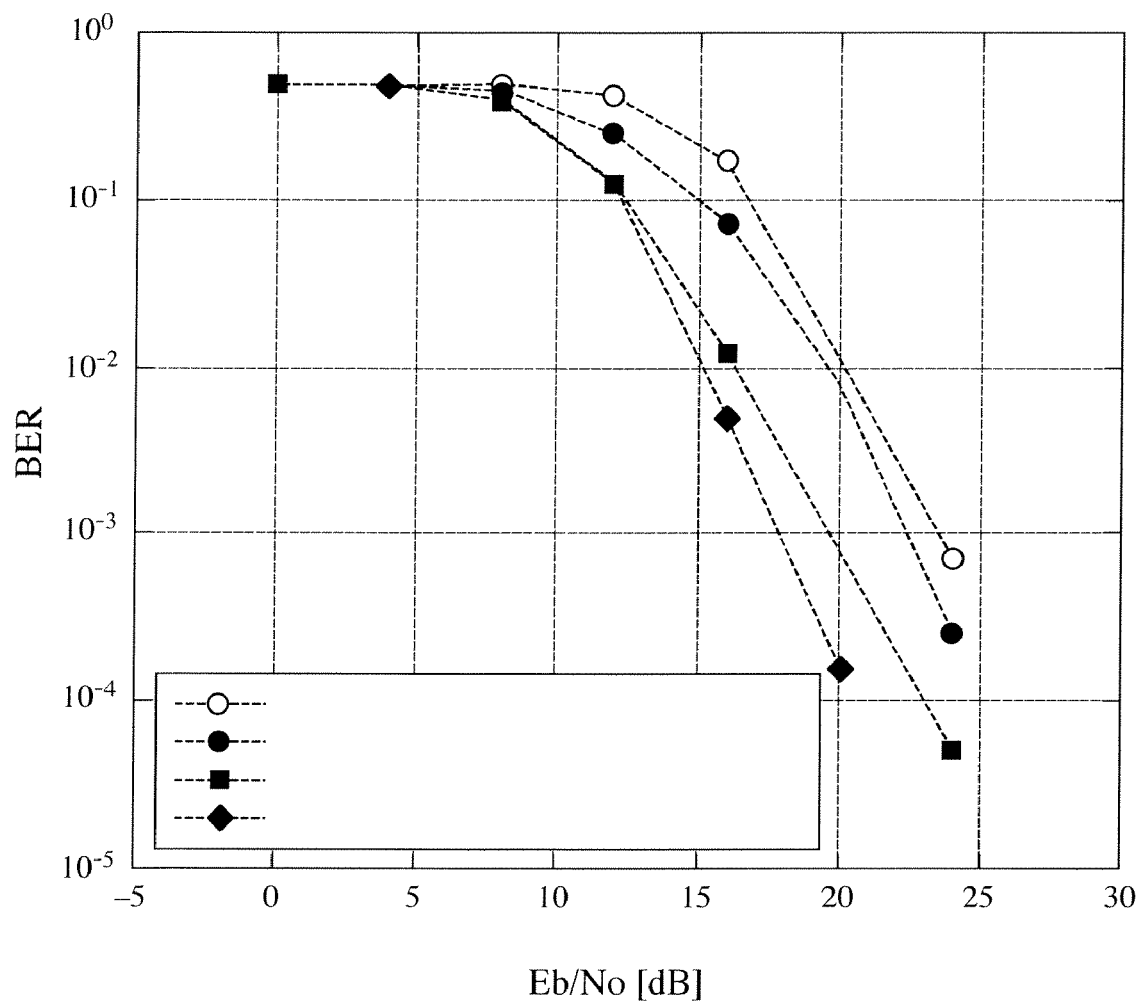
FIG. 7 is a graph showing the results of an experiment conducted in computer simulation.
Figure 8:
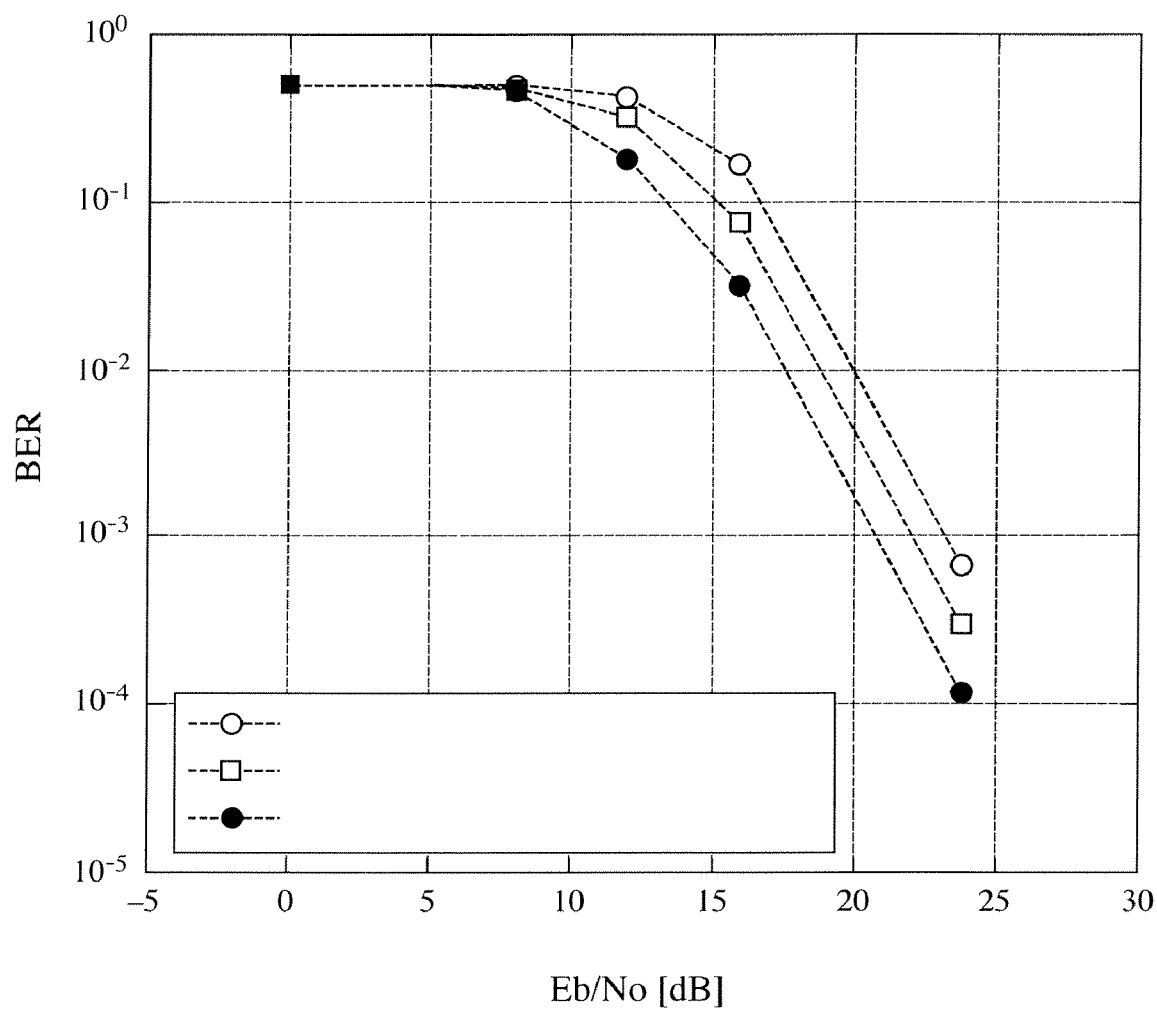
FIG. 8 is a graph showing the results of an experiment conducted in computer simulation.

FIGS. 6, 7 and 8 are graphs showing the results of studying the performance of the present system on the following data in computer simulation. In the graphs, the longitudinal axis represents a BER (Bit Error Rate).

data modulation system . . . QPSK frame size . . . 12 symbols (two symbols of pilot and ten symbols of data per frame)

Fourier transform size ... 1024
the number of carriers ... 1024
guard interval ... 256 sample per symbol
fading model ... 18-path Reilly fading
Doppler frequency ... 10 Hz
FEC ... convolution code (r=½, K=7)
interleave type ... bit interleave, Viterbi soft decoding
antenna ... the transmission side has two different polarization antennas, and the reception side has a vertical polarization antenna FIG. 6 is a graph showing the BER performance with respect to various XPD values (P1/P2) under an AGWN channel, the lateral axis representing the XPD value (P1/P2). It is apparent from the diagram that when the reception powers become identical, the BER performance falls as compared with a case of different reception powers. As the absolute value of the XPD value (P1/P2) is considered to be about 5 dB to 15 dB, the embodiment can ensure communication over a range where the BER performance does not drop significantly.

FIG. 7 shows the BER performances for the conventional SDM/OFDM system (the system having two transmit antennas using only the vertical polarization polarity and one receive antenna) and the SDM/OFDM system of the embodiment (XPD values of 5 dB, 10 dB and 15 dB). The graphs for the four kinds are plotted with white diamonds, black circles, black squares and black diamonds, respectively.

When different signals are transmitted from the vertical polarization polarity antenna and the horizontal polarization polarity antenna, the XPD value varies between 5 dB and 15 dB on the reception side depending on the environment; however, it is apparent from the graph that the BER performance is improved in any of the cases.

FIG. 8 shows the BER performances for the conventional SDM/OFDM system (the system having two transmit antennas using only the vertical polarization polarity and one receive antenna), the conventional SDM/OFDM system (further using the prephasing process), and the SDM/OFDM system of the embodiment. The graphs for the three kinds are plotted with white circles, white squares and black circles, respectively.

It is apparent that the embodiment has improved the BER performance as compared with the prior art by the use of different polarization antennas on the transmission side and further adaptation of the prephasing process.

INDUSTRIAL APPLICABILITY

The invention can provide a communication system, a transmitter, a receiver, a transmitting method, and a receiving method, which efficiently perform communications using different polarization antennas, and a program which allows a computer to realize them.

The invention claimed is:

1. A communication system comprising a transmitter and a receiver, wherein
    (a) the transmitter comprises:
    a coding unit which codes data to be transferred;
    a serial-parallel converting unit which performs serial-parallel conversion of the coded signal to two signal groups;
    a first transmission unit which receives one of the serial-parallel converted signal groups; and
    a second transmission unit which receives an other one of the serial-parallel converted signal groups;
    each of the first transmission unit and the second transmission unit including:
    a prephasing unit which performs a prephasing process on each of signals included in the input signal group received;
    an inverse Fourier transform unit which performs inverse Fourier transform on signals originating from the prephasing process; and
    a transmitting unit which transmits the inverse Fourier transformed signal with a predetermined polarization, and wherein,
    a polarity of the predetermined polarization of the first transmission being orthogonal to a polarity of the predetermined polarization of the second transmission unit,
    (b) the receiver comprises:
    a receiving unit which receives a signal transmitted from the transmitter with a predetermined polarization;
    a Fourier transform unit which performs Fourier transform on the received signal;
    a detection unit which performs MLD (Maximum Likelihood Detector) detection of signals originating from the Fourier transform;
    a parallel-serial converting unit which performs parallel-serial conversion on the MLD detected signals; and
    a decoding unit which decodes a signal originating from the parallel-serial conversion to output the transferred signal, and
    (c) the receiver generates feedback information for the prephasing process in the transmitter, and sends the feedback information to the transmitter,
    the transmitter performs the prephasing process on each of the signals based on the feedback information sent from the receiver in such a way that a probability that a same phase is generated becomes lower, and
    the range of the phase control in the prephasing process is about 10 degrees.

2. The communication system according to 1, wherein each of the first transmission unit and the second transmission unit of the transmitter multiplexes the input signals received and a pilot signal, performs serial-parallel conversion on a signal originating from the multiplexing, and performs a prephasing process on signals originating from the serial-parallel conversion, instead of performing a prephasing process on the input signals received.

3. A transmitter in the communication system as set forth in claim 1 or 2.

4. A receiver in the communication system as set forth in claim 1 or 2.

5. A transmitting method comprising:
    a coding step which codes data to be transferred;
    a serial-parallel converting step which performs serial-parallel conversion of the coded signal to two signal groups;
    a first transmission step which receives one of the serial-parallel converted signal groups; and
    a second transmission step which receives an other one of the serial-parallel converted signal groups;
    each of the first transmission step and the second transmission step including:
    a prephasing step which performs a prephasing process on each of signals included in the input signal group received;
    an inverse Fourier transform step which performs inverse Fourier transform on signals originating from the prephasing process; and
    a transmitting step which transmits the inverse Fourier transformed signal with a predetermined polarization, and wherein, a polarity of the predetermined polarization of the first transmission being orthogonal to a polarity of the predetermined polarization of the second transmission step, the prephasing step performing the prephasing process on each of the signals based on feedback information sent from a receiver in such a way that a probability that a same phase is generated becomes lower, and the range of the phase control in the prephasing process is about 10 degrees.

6. The transmitting method according to 5, wherein each of the first transmission step and the second transmission step multiplexes the input signals received and a pilot signal, performs serial-parallel conversion on a signal originating from the multiplexing, and performs a prephasing process on signals originating from the serial-parallel conversion, instead of performing a prephasing process on the input signals received.

7. A receiving method comprising:

a receiving step which receives a signal transmitted from a transmitter with a predetermined polarization;

a Fourier transform step which performs Fourier transform on the received signal;

a detection step which performs MLD (Maximum Likelihood Detector) detection of signals originating from the Fourier transform;

a parallel-serial converting step which performs parallel-serial conversion on the MLD detected signals; and a decoding step which decodes a signal originating from the parallel-serial conversion to output the transferred signal, wherein feedback information for a prephasing process in the transmitter is generated and sent to the transmitter, and the range of the phase control in the prephasing process is about 10 degrees.

8. A non-transitory computer-readable information medium storing a program which allows a computer to function as the transmitter in the communication system as set forth in claim 1 or 2.

9. A non-transitory computer-readable information medium storing a program which allows a computer to function as the receiver in the communication system as set forth in claim 1 or 2.

* * * * *